C. T. BUSH.
Guard Finger for Harvesters.
No. 49,713. Patented Sept. 5, 1865.
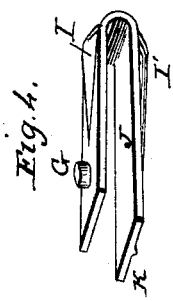
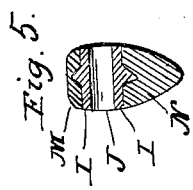
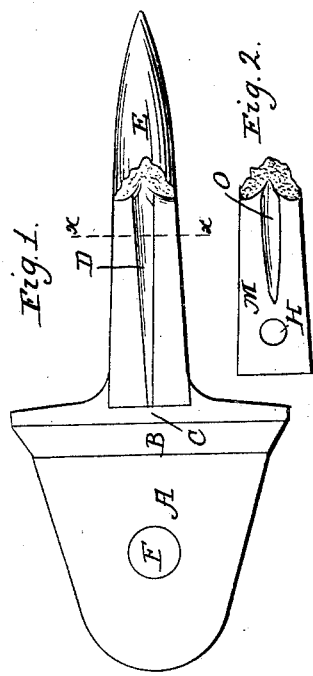
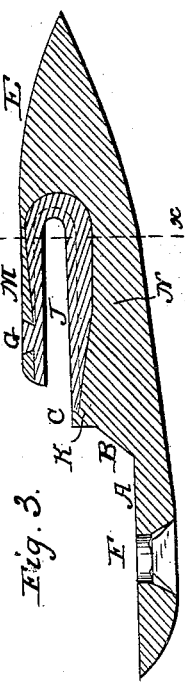
Witnesses:
Inventor:
Clark T. Bush

UNITED STATES PATENT OFFICE.

CLARK T. BUSH, OF RENSSELAERVILLE, NEW YORK.

IMPROVEMENT IN GUARD-FINGERS FOR HARVESTERS.

Specification forming part of Letters Patent No. 49,713, dated September 5, 1865.

*To all whom it may concern:*

Be it known that I, CLARK T. BUSH, of the town of Rensselaerville, in the county of Albany and State of New York, have invented a new and useful Improvement in Guard-Fingers for Harvesting-Machines; and I do declare the following to be a full, clear, and exact description of the same, reference being had to the accompanying drawings, making a part of this specification.

The nature and object of my invention consist in plating or lining the slot of the guard-finger through which the knife vibrates, both above and below the cutter, with a metal of greater density or hardness than the main portion of the guard-finger, in order to afford hard cutting-edges for the knife to cut against, and at the same time to allow the use of a softer and thereby a stronger material for the main portion of the guard-finger, thus effecting by uniting the two kinds of material the double purpose of a light, strong guard-finger and one which will present hard cutting-edges to resist the action of the knife and render the severing of the stalks more easy and certain.

Harvesting-machines now in general use have their knives or cutters ground with a bevel upon their top sides, making the cutting-edge on the lower side, or the side nearest to the ground. When the guard-finger is made wholly of soft iron the action of the knife, by constant and rapid vibration, soon wears off the edges of the guard-finger with which it comes in contact during the operation of severing the stalks of grain or grass. The edge of the guard-finger being thus worn or rounded off, the grass is drawn in and frequently clogs or chokes up the guard-finger and stops the operation of the machine. When the guard-fingers have become slightly worn or rounded off upon their edges the knives have to be ground much more frequently and kept in a much sharper state than if hard, sharp cutting-edges on the guard-fingers were opposed to the action of the cutter. At other times, before the guard-finger becomes thus rounded or worn off, the knife, being so much harder than the guard-finger and having a sharp cutting-edge, sometimes cuts a notch into the soft iron of the guard-finger, and thus brings the knife, and thereby the whole machine, to a sudden stop.

I am aware that steel plates have been placed upon the top part of the lower portion of the guard-finger and have been held there by rivets and other devices; but this method has only partially remedied the difficulty.

In practice it has been found that although the edges of the knife generally come in contact with the top edges of the lower portion of the guard-fingers, yet it frequently happens that the cutter comes in contact with the lower edge of the cap or top portion of the guard-finger, and in this case the same result ensues, the cutter being stopped by cutting into the top or cap of the guard-finger. The two conditions in which this result is most likely to take place are upon uneven ground and upon soil of a sandy or gravelly nature, where small gravel-stones are frequently found.

Machines now in general use are constructed (for the sake of lightness and the facility with which they adjust themselves to uneven ground) with finger-bars as flexible and elastic as possible. When the finger-bar, in the progressive movement of the machine, is passing over uneven ground it is liable to undergo a certain amount of twisting or bending, and this changes the relative position of the plane of the cutter with the planes of the slots in the guard-fingers through which the cutters vibrate, and thus it frequently happens that the stalks are severed by the cutter against the upper portion or cap of the guard-finger. Again, in gravelly soil small stones are sometimes drawn in between the sections of the knife and the lower portion of the guard-finger, and thus raise the cutter until its edge comes in contact with the upper portion or cap of the guard-finger, notwithstanding the cutters have the bevel ground on their upper side to form their cutting-edges.

To enable others skilled in the art to make and use my invention, I will now proceed to describe the same with reference to the accompanying drawings, making a part of this specification, in which—

Figure 1 is a top view of that part of the guard-finger which is to be made of soft iron with the cap or top portion broken off. Fig. 2 is a top view of the portion broken off in Fig. 1 inverted. Fig. 3 is a longitudinal section of the guard-finger when completed. Fig. 4 is an isometrical view of that portion of the guard-finger to be made of harder material, which forms the lining to the slot in the guard-finger. Fig. 5 is a cross-section of the guard-finger completed, taken on line x x, Figs. 1 and 3.

In the several figures like letters of reference refer to like parts.

The larger or softer portion of the guard-finger is made in one piece of metal, and may be either cast, malleable, or wrought. This portion of the guard-finger is made first, and is cast or forged with a cavity or slot of sufficient thickness to receive the lining or facing material, and also to leave a sufficient slot for the cutter to vibrate through. This cavity is distinctly shown in Figs. 1, 2, 3, and 5, and is made at its rear end of a dovetail form, as shown at C K, Fig. 3. This cavity is also provided with a depression, as shown at D, Fig. 1, and at O, Fig. 2. Figs. 1 and 2 show the top part of the guard-finger or cap removed and inverted in order to show this depression more clearly. If desirable, this depression may extend continuously from C, Fig. 1, longitudinally across the lower plane of the cavity or slot toward the point of the guard-finger, and so on vertically upward across the front end of the slot, and then backward upon the upper plane of the slot about two-thirds the length of the cap. In malleable or cast iron guard-fingers this depression may be cast in the guard; but in wrought guard-fingers it can be readily formed by the use of swages.

The cap part of the softer portion of the guard-finger is furnished with a hole, as shown at H, Fig. 2. This hole is tapering in form, being largest at the top side, as shown at G, Fig. 3. This portion of the guard-finger, having been completed in the way above described, is now ready for the reception of the lining or facing. This is inserted and held in its place in the following manner: The softer portion of the guard-finger is "molded up" or placed in the sand in the same manner as the pattern from which it was originally cast was molded, except that a piece of cold iron, known among iron-founders as a "chill," is placed within the cavity between the upper and lower portions of the guard-finger. This chill corresponds in thickness with the desired depth of the slot in the guard-finger, and is placed in the sand with one of its exterior faces resting on the projection C, (shown in Figs. 1 and 3,) and in such a position as to leave a sufficient amount of open space at all other points between itself and inner surface of the cavity of the softer portion of the guard-finger in which it is placed. The mold being properly pierced for the introduction of melted iron, a sufficient amount of sharp white iron is then turned in and cast around the chill and forms the chilled or hardened portion of the guard-finger, as shown in the drawings. The flanges I I' and the knob G, Fig. 4, running into the depressions D and O, and the tapering hole H, Figs. 1 and 2, and under the dovetail C K, Fig. 3, holds this hardened portion, of which they form a part, securely in its place.

Should it be found that the chilled or hardened portion of the guard-finger was not snugly held in its place by reason of shrinkage or otherwise, the iron of the soft part of the guard-finger at C, Figs. 1 and 3, can be readily "set up" with a cold-chisel—an operation well known to machinists. The edges of the guard-finger against which the knife cuts, both top and bottom, can then be ground, and guard the is finished. In cases when malleable or wrought guard-fingers are used this plating or lining may be accomplished by first casting the piece for the lining of hard white iron around a chill or by making the same of steel separate from the other portion of the guard-finger, as shown at Fig. 4, and then inserting and confining it in its place by rivets or otherwise.

Having thus fully described the nature and object of my invention, what I claim therein as new, and desire to secure by Letters Patent, is—

Facing or lining both faces of the slot of the guard-fingers of a harvesting-machine, through which the cutters vibrate, substantially as and for the purpose set forth.

CLARK T. BUSH.

Witnesses:
 M. F. WHITE,
 ABRA QUACKENBUSH.